United States Patent
Galavotti et al.

(10) Patent No.: US 9,869,990 B1
(45) Date of Patent: Jan. 16, 2018

(54) AUTOMATIC POSITIONING MOVEMENT CALCULATOR

(71) Applicant: D.P. Technology Corp., Camarillo, CA (US)

(72) Inventors: Luigi Galavotti, Camarillo, CA (US); Carroll Russell Loy, Camarillo, CA (US); Francis Kenyon Whetsell, Camarillo, CA (US)

(73) Assignee: D.P. TECHNOLOGY CORP., Camarillo, CA (US)

( * ) Notice: Subject to any disclaimer, the term of this patent is extended or adjusted under 35 U.S.C. 154(b) by 362 days.

(21) Appl. No.: 14/025,637

(22) Filed: Sep. 12, 2013

(51) Int. Cl.
- *G05B 19/00* (2006.01)
- *G05B 19/19* (2006.01)
- *G05B 19/18* (2006.01)

(52) U.S. Cl.
CPC ............ *G05B 19/19* (2013.01); *G05B 19/182* (2013.01)

(58) Field of Classification Search
CPC .............................. G05B 19/19; G05B 19/182
USPC .......................... 700/159, 160, 173, 179, 182
See application file for complete search history.

(56) References Cited

U.S. PATENT DOCUMENTS

| | | | | |
|---|---|---|---|---|
| 4,951,217 A * | 8/1990 | Clack | ..................... | G05B 19/41 700/178 |
| 5,971,589 A * | 10/1999 | Hazama | ............. | G05B 19/4097 700/145 |
| 6,459,952 B1 * | 10/2002 | Dundorf | ............ | G05B 19/4069 700/180 |
| 7,805,285 B2 * | 9/2010 | Fukaya | ............. | G05B 19/4069 700/179 |
| 8,538,574 B2 * | 9/2013 | Hahn | ............... | G05B 19/40937 700/159 |
| 8,560,113 B2 * | 10/2013 | Diehl | ............... | G05B 19/40937 345/420 |
| 9,134,723 B2 * | 9/2015 | Nonaka | ............. | G05B 19/4069 |
| 2001/0048857 A1 * | 12/2001 | Koch | ................. | G05B 19/4061 409/132 |
| 2002/0095236 A1 * | 7/2002 | Dundorf | ............ | G05B 19/4069 700/182 |
| 2002/0133264 A1 * | 9/2002 | Maiteh | ............... | G05B 19/4097 700/182 |
| 2003/0114945 A1 * | 6/2003 | Hirano | ............... | G05B 19/4097 700/97 |
| 2008/0103741 A1 * | 5/2008 | Fukaya | ............. | G05B 19/4069 703/7 |
| 2010/0292822 A1 * | 11/2010 | Hahn | ............... | G05B 19/40937 700/98 |
| 2011/0251715 A1 * | 10/2011 | Diehl | ............... | G05B 19/40937 700/191 |
| 2012/0283862 A1 * | 11/2012 | Nonaka | ............. | G05B 19/4069 700/97 |
| 2014/0025192 A1 * | 1/2014 | Seya | .................. | G05B 19/4063 700/174 |
| 2015/0039122 A1 * | 2/2015 | Barakchi Fard | .... | G06F 17/5009 700/186 |

* cited by examiner

*Primary Examiner* — Charles Kasenge
(74) *Attorney, Agent, or Firm* — Brooks Acordia IP Law, P.C.; Pejman Yedidsion (57) ABSTRACT

Methods, systems, and devices for determining a positioning movement of a cutting tool based on a received virtual model, a determined start position and a determined end position, and a set of objects of a machining setup, where the set of objects may represent a current state of the set of objects. Optionally, the determining of the positioning movement may be based on user input parameters.

20 Claims, 11 Drawing Sheets

TABLE 1

| | Application Event |
|---|---|
| 1000 | Operation Rebuild |
| 1010 | Operation Reorder |
| 1020 | Operation Deletion |
| 1030 | Setup Change |
| 1040 | Tool Modification |
| 1050 | Configuration Modification |

AUTOMATIC POSITIONING MOVEMENT CALCULATOR

TECHNICAL FIELD

The invention in its several embodiments relates generally to the field of computer-aided manufacturing (CAM), and in particular to the automatic creation of positioning motions between machining processes on computer-controlled machines.

BACKGROUND

Computer-aided manufacturing (CAM) systems generate a set of instructions for computer numerical control (CNC) machine tools. The CNC machine tools are, for example, used in machine shops for the production of discrete parts, in order to manufacture parts from a stock of material. Typically, instructions are grouped into cutting operations, or sequences that are applicable to a specific geometric feature of the part, and utilize a particular machining strategy and cutting tool. By and large, most CAM solutions employ the use of computer-aided design (CAD) models of the part to facilitate the creation of cutting operations, i.e., the relative movement between a workpiece and the cutting tool, commonly referred to as "toolpaths." Utilizing 3D models allows toolpaths to be calculated with greater precision, and in a manner which avoids gouging or otherwise damaging the workpiece.

SUMMARY

Embodiments of the Computer-aided manufacturing (CAM) system of the present disclosure may use a virtual model of a machine tool, fixtures, and workpieces to generate positioning movements, referred to as "links." This virtual model may include a 3D representation of the machine and machine components, as well as a kinematic definition and a controller description, so that links may occur only within machine capabilities, and conform to allowable behaviors of the machine tool controller. In addition, computation of the material removed from the stock by previous operations ensures that links do not cause undesired contact, and that the resulting motion is adapted to the workpiece just as it would be on the machine tool. Additionally, the links may also be configurable, should the programmer desire to do so, and as a result, motions are suited not only to the machine and workpiece, but also to the manufacturer of the part. Accordingly, system, device, and method embodiments are disclosed where the links calculator may automatically determine the optimal positioning movements of a cutting tool between or within machining operations and tool changes, avoiding all collisions between any combination of tools, machines, fixtures, or workpieces.

Embodiments may include a method of determining a positioning movement of a cutting tool, where the method may comprise: detecting a system event associated with a computer numerical control (CNC) machine tool, where the system event may be an event that occurs in a computer-aided manufacturing (CAM) system; determining, based on the detected system event, a start position associated with an end position of a toolpath of a preceding machine task and an end position associated with a start position of a toolpath of a subsequent machine task; receiving a virtual model of the CNC machine, where the virtual model may comprise a representation of a machine tool and a representation of a set of machine tool components, and where the representation of the machine tool may comprise a set of kinematic constraints associated with the CNC machine tool; and determining a positioning movement of a cutting tool based on the received virtual model, the determined start position and the determined end position, and a set of objects of a machining setup.

Some exemplary embodiments of the method may further comprise computing an amount of material removed from the set of objects by a set of preceding machine tasks; and determining a current state of the set of objects based on the removed material. Some exemplary embodiments of the method may further comprise maintaining, via the CNC machine tool, a distance between the machine tool and the set of objects based on the determined current state of the set of objects thereby reducing unnecessary motions and a travel distance of the machine tool. Some exemplary embodiments of the method may further comprise receiving, from the CAM system, a set of tool vectors, where the set of tool vectors are associated with the determined start position and the determined end position. Some exemplary embodiments of the method may further comprise receiving, from the CAM system, a set of rotary axis positions, where the set of rotary axis positions are associated with the determined start position and the determined end position.

In some exemplary embodiments of the method, the positioning movement of the cutting tool may be further based on user input parameters. In some exemplary embodiments of the method, the determined positioning movement of the cutting tool may be positioning movement between machine tasks. In some exemplary embodiments of the method, the machine tasks comprise at least one of: machining operations, tool changes, parks, and non-cutting operations, where the machining operations are a cutting operation. In some exemplary embodiments of the method, the start position and the end position describe a state of the CNC machine tool. In other exemplary embodiments of the method, the start position and the end position each comprise an orientation of the CNC machine tool. Additionally, in one embodiment, the positioning movement of the cutting tool may be a non-cutting positioning movement between cutting movements by the CNC machine tool and alternatively, the positioning movement of the cutting tool may be further based on a movement where the machine tool may be free of collisions with the set of objects.

Embodiments may also include a device for generating instructions for machine tool, the device comprising: a processor and addressable memory, the processor configured to: detect a system event associated with a computer numerical control (CNC) machine tool, where the system event may be an event that occurs in a computer-aided manufacturing (CAM) system; determine a start position associated with an end position of a preceding toolpath and an end position associated with a start position of a subsequent toolpath based on the detected system event; receive, from the CAM system, a virtual model of the CNC machine, where the virtual model may comprise a representation of a machine tool and a set of machine tool components, and where the representation of the machine tool may comprise a set of kinematic constraints associated with the CNC machine tool; and determine a positioning movement of a cutting tool based on the received virtual model, the determined start position and the determined end position, and a set of objects of a machining setup. In some exemplary embodiments of the device, the processing module may be further configured to: maintain, via the CNC machine tool, a distance between the machine tool and the set of objects based on a computation of an amount of material removed from the set of objects by a set of preceding machine tasks and determination of a current state of the set of objects based on the removed material, thereby reducing unnecessary motions and a travel distance of the machine tool. In another exemplary embodiment of the device, the processing module may be further configured to: receive, from the CAM system, at least one of: a set of tool vectors and a set of rotary axis positions, where the set of tool vectors and the set of rotary axis positions are each associated with the determined start position and the determined end position.

Embodiments may also include a CAM system, where the CAM system may comprise: a planning module, where the planning module may comprise a processor and an addressable memory, the processor configured to: transmit a system event associated with a computer numerical control (CNC) machine tool, where the system event may be an event that occurs in the CAM system; and a positioning calculator, where the positioning calculator may comprise a processor and an addressable memory, the processor configured to: determine a start position associated with an end position of a preceding toolpath and an end position associated with a start position of a subsequent toolpath based on the received system event from the planning module; receive, from the CAM system, a virtual model of the CNC machine, where the virtual model may comprise a representation of a machine tool and a set of machine tool components, and where the representation of the machine tool may comprise a set of kinematic constraints associated with the CNC machine tool; and determine a positioning movement of a cutting tool based on the received virtual model, the determined start position and the determined end position, and a set of objects of a machining setup.

The exemplary embodiment of the CAM system may further comprise: a machining apparatus; and where the positioning calculator is further configured to: maintain, using the machining apparatus, a distance between the machine tool and the set of objects based on a computation of an amount of material removed from the set of objects by a set of preceding machine tasks and determination of a current state of the set of objects based on the removed material, thereby reducing unnecessary motions and a travel distance of the machine tool.

BRIEF DESCRIPTION OF DRAWINGS

Embodiments may be illustrated by way of example and not limitation in the figures of the accompanying drawings, and in which.

DETAILED DESCRIPTION

Computer-aided manufacturing (CAM) computing systems generate, with a high degree of automation, instructions for accurate and efficient cutting operations or machine tasks by using information available from simulated versions of parts, workpieces, and machine tools and its constituents. Some exemplary machine tasks may include: machining operations, tool changes, parks, and/or other non-cutting operations. The disclosed embodiments of the CAM system may achieve automation, reliability, and productivity for positioning motions on a machine tool. Specifically, motions between machining operations or machine tasks may be optimized and made reliable, via virtual machine tool models comprising information, such as a machine's kinematics or a machine's controller specifications to create such ideal motions. Some embodiments determine non-cutting positioning movement between or within cutting and/or non-cutting machine processes on a machine tool which may be characterized by, for example, collision-free transitions optimized to the machine context, i.e., machine solids, tools, fixtures, and workpieces; motions in a configuration adapted to the machine tool's kinematics and controller definition; and by automatic calculation without user intervention during the CAM programming. The machine may also perform non-cutting operations, such as to "park" at a designated location, to "go home" to a machine-specific position, or to perform a tool change. In some embodiments, positioning movements to direct the tool to move from the end of the previous operation to the start of the subsequent one exists between any of these cutting or non-cutting operations. An exemplary CAM system disclosed may create positioning motions that are optimal and do not result in undesired contact with the workpiece or machine tool components. In addition, consideration of material removed during previous operations may further optimize the toolpaths. Some exemplary CAM systems, via positioning movement computing devices, may also utilize virtual representations of machine tools and other components, such as fixtures. In some embodiments, virtual models of machine tool solids may be used by the CAM system to generate operations which are even more suitable for the desired machine, for example, within machine axis limits, as well as free of collisions or undesired contact with any workpiece or machine components. Furthermore, virtual models may be used to simulate the resulting machining operations to ensure accurate and collision-free results which operate within the machine's capabilities.

Figure 1A:
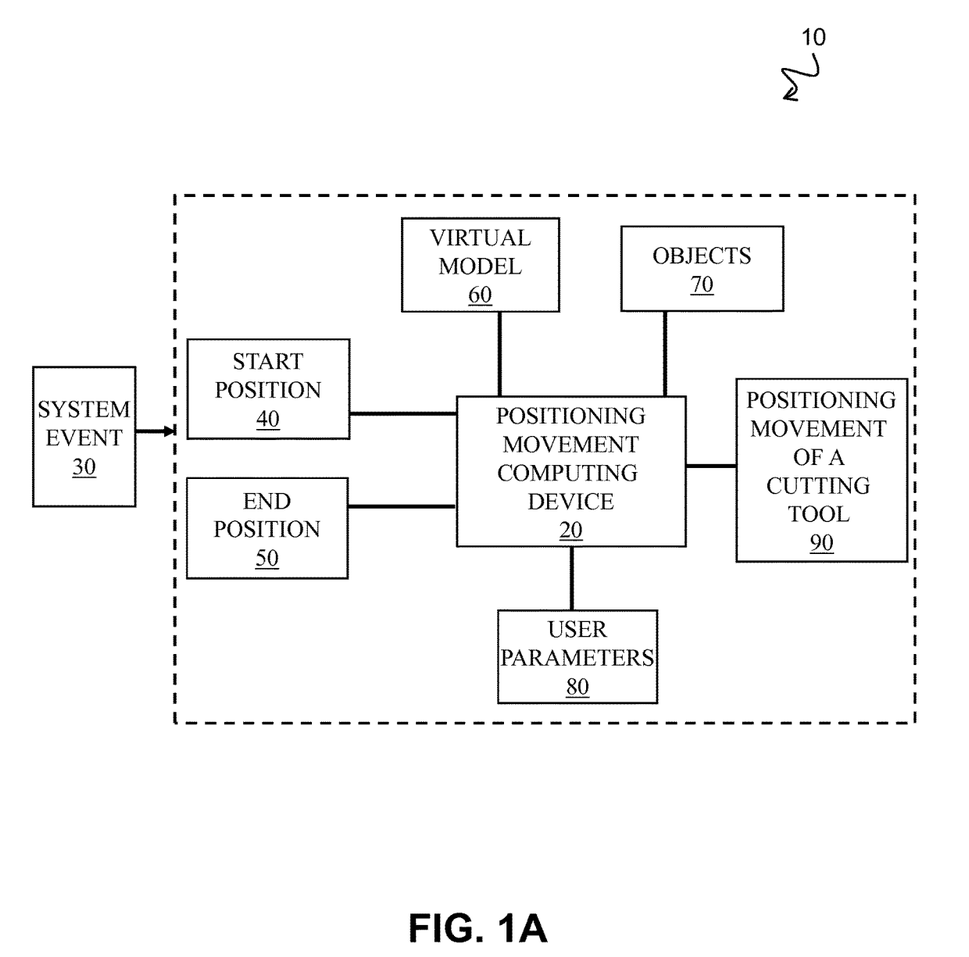
FIG. 1A depicts, in a functional block diagram, an exemplary embodiment of the CAM system comprising a positioning movement component.

FIG. 1A depicts in a functional block diagram, an embodiment of the CAM system 10, where the system may comprise a positioning movement computing device 20, i.e., a link move calculator, which may first detect a system event 30 associated with a computer numerical control (CNC) machine tool, where the system event 30 may be an event that occurs within the system. That is, the CAM system may provide notifications for exemplary events such as: operation rebuild, operation reorder, operation deletion, setup change, tool modification, and modification of links parameters. The positioning movement computing device 20 may then receive, from the CAM system, a virtual model 60 of the CNC machine, where the virtual model 60 may comprise a representation of a machine tool and a set of machine tool components, and where the virtual representation of the machine tool further may comprise a set of kinematic constraints associated with the CNC machine tool. In one embodiment, each positioning instruction or motion may be configured to the specific kinematics of the machine tool, as well as the controller of that machine tool, and optionally, the solids. Additionally, the positioning movement computing device 20 may utilize a virtual machine model that includes: a kinematic definition of the machine and a logical description of the machine tool's controller. An exemplary virtual model 60 may comprise solid representations of objects which may be used in the manufacturing process of a part, including, for example, machine tools, fixtures, parts, stocks, tools, and holders. That is, each transition of the machine tool may be computed based on a virtual model of the machine tool.

The positioning movement computing device 20 may then determine a start position 40 associated with an end position of a toolpath of a preceding machine task and an end position 50 associated with a start position of a toolpath of a subsequent machine task, where the start position 40 and the end position 50 are received based on the detected system event 30. That is, once a system event is triggered, the CAM system may then send the start position 40 and end position 50 to the positioning movement computing device 20. In one exemplary embodiment, the start position 40 and end position 50 may comprise corresponding tool vectors and describe the full machine state, and the axis values—in a known machine coordinate system or work offset—as well as the tool orientation, e.g., as a vector, at each location. The positioning movement computing device 20 may now determine a positioning movement of a cutting tool 90, e.g., a toolpath, based on the received virtual model 60, the determined start position 40 and the determined end position 50, and a set of objects of a machining setup 70. That is, the determined positioning motion may be optimized to a virtual model of the machine tool and machine tool components as well as objects of the machining setup, e.g., stocks and fixtures. Additionally, in one embodiment, the determined positioning motions may optionally be configured based on user parameters 80. In this embodiment, the positioning motions generated may avoid collisions, or otherwise undesired contact, between the objects, e.g., solids. That is, the positioning movement computing device 20 may also maintain a reasonable distance, where the distance may be configured by the user via the user parameters 80, between the machine tool and these objects, while also reducing unnecessary motions and distance the tool must travel. Additionally, the reasonable distance may serve to allow some room for operator comfort, as well as inaccuracies of the virtual model 60.

In one exemplary embodiment, the CAM system may determine the non-cutting transitions between or within operations which may be: (1) machining operations: those operations in which a cutting tool is removing material on a specific geometric feature of the part; (2) specific groupings of toolpath elements, which may comprise some portion of a machining operation; and (3) non-cutting operations: motions on the machine which serve some specific function other than positioning motions between operations, e.g., parks, machine home, and tool changes.

In some embodiments, the kinematics of a machine may comprise a definition of each motion axis on the machine, the type of each axis, e.g.: rotary or linear, and the capabilities of that axis, for example: whether the rotary axis may be capable of performing spinning operations. The kinematic model may also provide the position, velocity, and acceleration limits of each axis, so that the positioning movement computing device, or links calculator, may choose the best available axis. Additionally, the kinematic chain may also be defined, which may be equivalent to a hierarchal list of the motion axes on that machine. Similarly, in another exemplary embodiment, the virtual machine controller may allow the machine tool model to accurately emulate its real-world counterpart. With a virtual machine controller, the machine tool model used by the automatic links calculator may comprise characterization of behaviors of that machine tool, which may influence the calculation of positioning motions.

In one embodiment, the links are automatically and dynamically created, destroyed, or re-created as a response to any and all relevant events, or changes in the CAM program that might necessitate it. It may be necessary for the positioning movement computing device, e.g., the automatic link move calculator, or links calculator, to respond to these events in order to satisfy the automation necessary. The links may be calculated with little or no direct manual input from the user. In order to provide sufficient flexibility to conform to the preferences for the manufacturer, programmer, or machine tool operator, a method to influence the result of the calculation is also disclosed. Among these configurations, a user, e.g., a high-level user, may define: (a) the order in which each axis moves, and which axes may move simultaneously; (b) a rapid feedrate to utilize for the positioning, or specifying a feedrate value; (c) mandatory clearance positions or clearance distances between the tool and other objects; and (d) when to output machine codes, e.g., work feedrate changes, work offset or work offset transformations, and coolant codes. The user may also define the criteria in which the above parameters might be defined differently based on the context. The above parameters may therefore be defined uniquely based on, for example: the expected axis positions during the link, the amount that the axis value will change: delta; the proximities of the tool, workpieces, and/or machining components, and the type of motion, e.g., "rotate tool center point" (RTCP), to/from tool change. The automatic links calculator may then automatically generate positioning motions between or within machining operations, as well as to or from tool changes, where the positioning motions may be optimized in a CAM system based on an intricate awareness of the program events, user preferences, machine tool, and the machining setup.

Figure 1B:
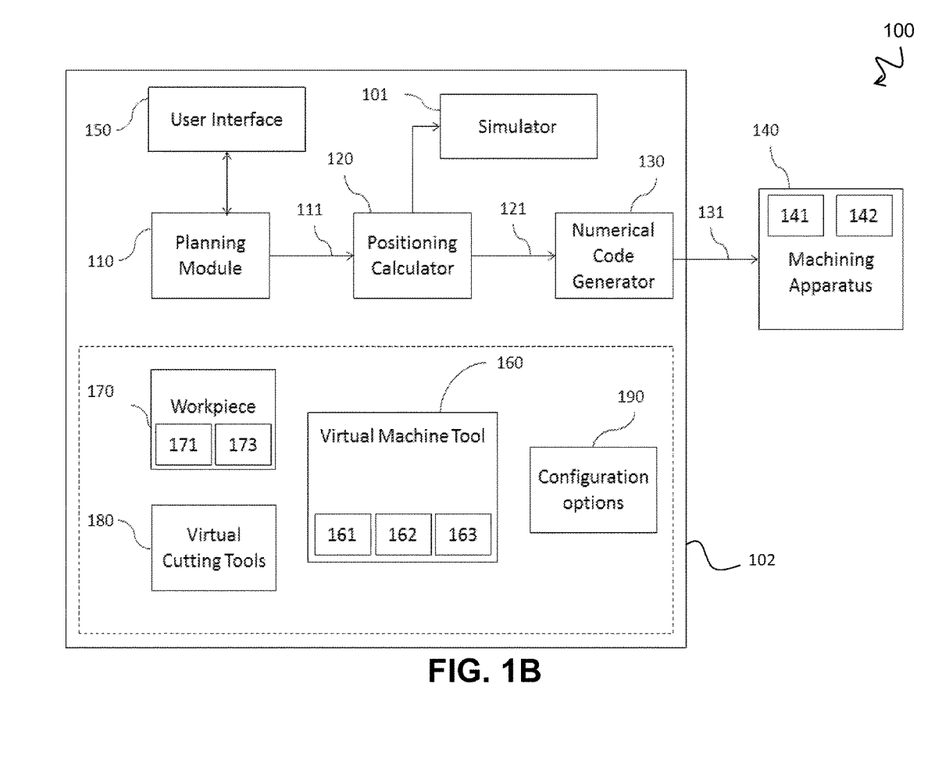
FIG. 1B depicts, in a functional block diagram, another exemplary embodiment of the CAM system.

FIG. 1B illustrates in a functional block diagram, an embodiment of the CAM system 100, where the system comprises a machining apparatus 140 and a computing device 102, the computing device 102 comprising a planning module 110, a positioning calculator 120, and a numerical code generator 130. The planning module 110 may further comprise a processing module and the numerical code generator 130 may also further comprise a processing module, where the processing module(s) may comprise (a) a processor and (b) addressable memory. The machining apparatus 140 may comprise a processing controller 141 and a set of drive axes 142. The machining apparatus 140 may provide a machining tool or cutting tool and may reorient the cutting tool relative to a workpiece according to instructions provided by the numerical code generator 130 as directed by the processing controller 141. The position of the cutting tool may be expressed in absolute positions of each machine tool axis, e.g., XYZ, and rotary positions, e.g., A—a rotary position about X—and, e.g., B—a rotary position about Y, and along motions such as segments or arcs, where the latter may typically be expressed using I, J, K, or R. The exemplary positions expressed may also be in any coordinate systems or machine work offsets. In one embodiment, each drive axis 142 may be used to position the cutting tool described in each instruction. The numerical code generator 130 may be responsive to the output of the planning module 110, and the positioning calculator 120. The planning module 110 may describe patterns applied for the machining of areas on a workpiece, and may additionally include at least one of: (1) instructions for approaching the workpiece; (2) instructions for departing the workpiece; and (3) instructions for movements linking machining sub-areas. Numerically controlled machines may automatically be operated by commands received by their processing units. In one embodiment, a user of the CAM system 100, via a user interface 150, may select files or objects for application by the planning module 110 to generate machining patterns 111. The positioning calculator 120 may then describe the positioning motions necessary to connect each machining pattern 111 generated by the planning module 110. The positioning calculator may access databases describing the machining apparatus 140 and the relevant context of the manufacturing processes, including (a) a representation of the workpiece 170 to be machined, which comprises a part or parts to be manufactured 171 and a stock or stocks from which the part will be produced 173, (b) descriptions of the cutting tool or tools 180 which may be utilized for manufacturing including tool holders, adaptors or extensions, and (c) a virtual description or model of the machine tool 160.

The virtual machine tool model 160 may describe the machining apparatus processing controller 141 by including a virtual controller 161 and may also describe the configuration and characteristics of the drive axes 142 by including a kinematic model 162 of the machining apparatus. The virtual machine tool model 160 may also describe a virtual model of the constructive solids 163 of the machining apparatus, as well as any solids incorporated during the manufacturing process, such as fixtures intended to secure the workpiece. The positioning calculator 120, with consideration of the databases 160, 170, 180, 190, may automatically determine a sequence of non-cutting positioning motions 121 upon notification of an appropriate event from the planning module 110. These motions 121 may position each machine axis as necessary to connect the tool positions and orientations between any machining process, such as operations, groups of toolpath elements, park positions, and tool changes. Such motions, after they have been processed to a numerical control (NC) code 131, are intended to preclude any unintentional collisions or contact on the machining apparatus when attempting to execute each instruction, and which are capable of being executed by the machine controller 141 on the drive axes 142. The operations defined by the planning module 111, as well as the positioning motions, may be input to a virtual simulation 101 of the machining program. Such simulation may also access the databases 160, 170, 180, 190, in order to accurately emulate the context of the manufacturing processes on the machining apparatus.

Figure 2:
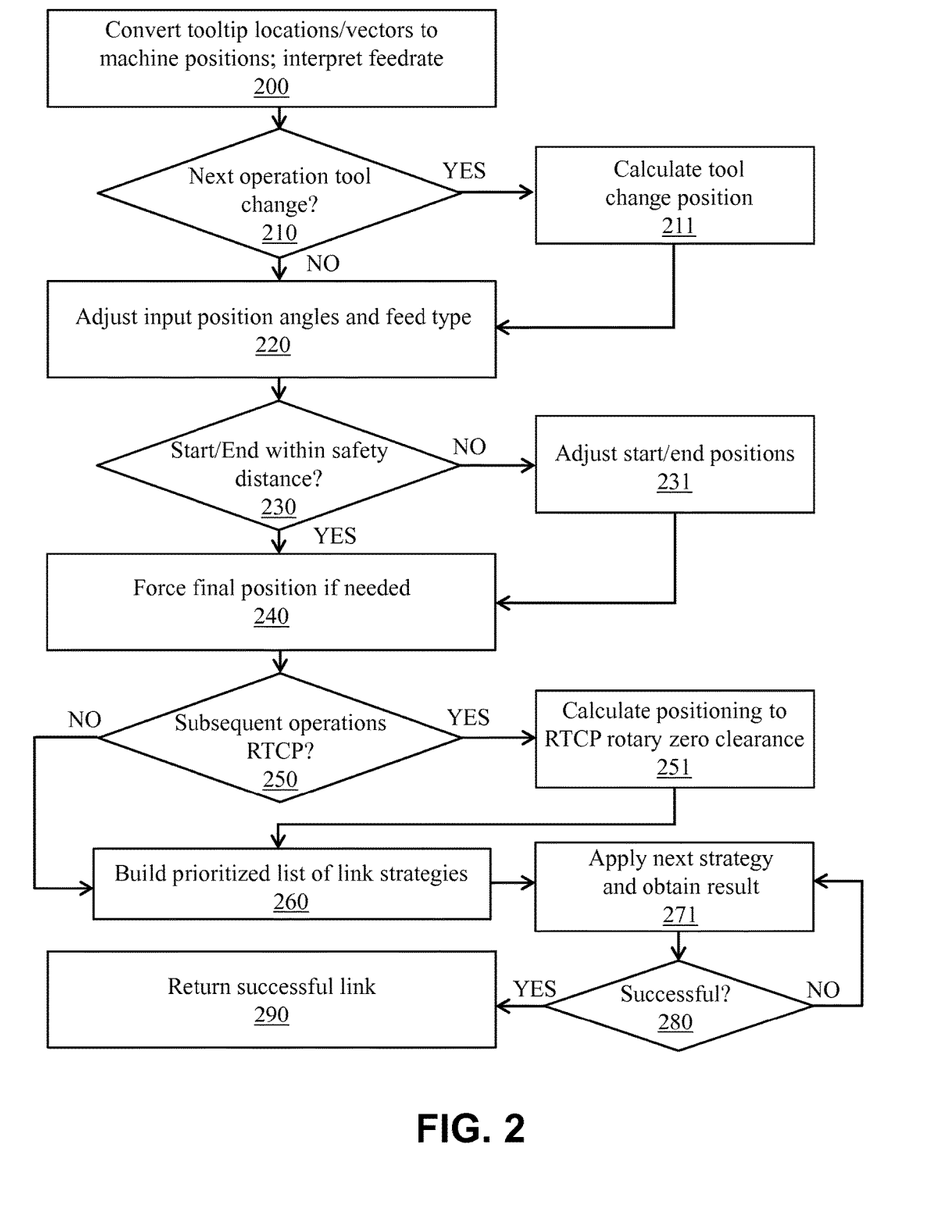
FIG. 2 depicts, in a top-level flowchart, an exemplary method of determining links.

FIG. 2 depicts an exemplary flowchart of the positioning movement computing device, e.g., automatic links calculator, where the automatic links calculator determines final tooltip location and vector information for the preceding machining process, and initial tooltip location and vector information for the subsequent machining process. The machining process may be any group of toolpath or machine motions, typically intended for material removal or other machine functions. These tooltip locations and vectors may then be converted 200 to machine positions and corresponding orientations. If the subsequent operation is a tool change 210, the position and rotary angles of the tool change are determined 211, and are then regarded as the end position.

In some embodiments, rotary axis angles, expressed in degrees or radians, may need to be adjusted to the nearest equivalent rotary angle of the final link position 220. Additionally, the input position feedrate may be adjusted to the one requested, typically done by the user via the user interface of the CAM software interface. If a safety distance is specified, the system then determines whether the start and end positions are beyond this distance 230. Should the start or end positions violate the requested safety distance, the positions are adjusted as necessary 231. When rotary movements are specified, where the final angle may have an equivalent value, the final position may be forced to the specified value 240, which may be necessary in the exemplary embodiment of the CAM simulation. The system then checks 250 if the subsequent operation utilizes an RTCP machining command, and if so, determines any motions necessary 251 to obtain a position necessary for the machine to enable this command. A prioritized list of link strategies may then be created 260, and in this priority, each strategy may be applied 271 and checked 280 to determine the validity of the particular strategy. If the strategy is unsuccessful, the next strategy is attempted 271. If the strategy is successful, however, the toolpath strategy is joined with any alterations in previous steps 220, 231, 251, and the resulting link is returned 290.

Figure 3:
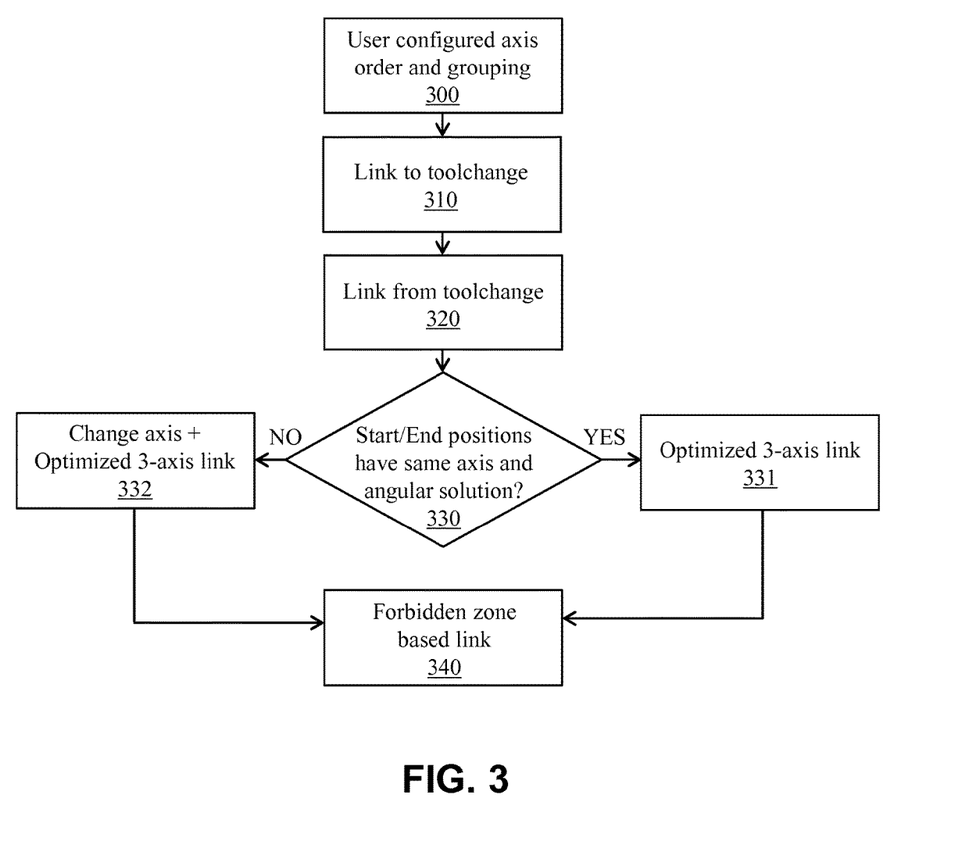
FIG. 3 depicts, in a top-level flowchart, an exemplary method of linking operations.

FIG. 3 depicts, in a top-level flowchart, an exemplary embodiment of the present invention where the links calculator may determine a prioritized list of link strategies 260 (FIG. 2) available. First, there may be preferred methods of linking operations 300 which may be determined by the user configuration options 190 (FIG. 1B). The user configuration options may specify, for example, the preferred order of motion for each drive axis. These options may be based on criteria which describe the context of the motion, for example: from a tool change, to a tool change, between operations, proximities of the tool, workpiece, and/or machining component, and being configured with RTCP off or with RTCP on. Next, and if applicable, a link 310 to the tool change position is determined. Similarly, if applicable, a link 320 from the tool change position is determined. In this exemplary embodiment, the link calculator may then check 330 to determine whether the start and end positions have the same axis and angular solution. If no rotary motions are necessary, an optimized 3-axis link is determined 331. Optionally, a forbidden zone based link 340 may then be determined.

Figure 4:
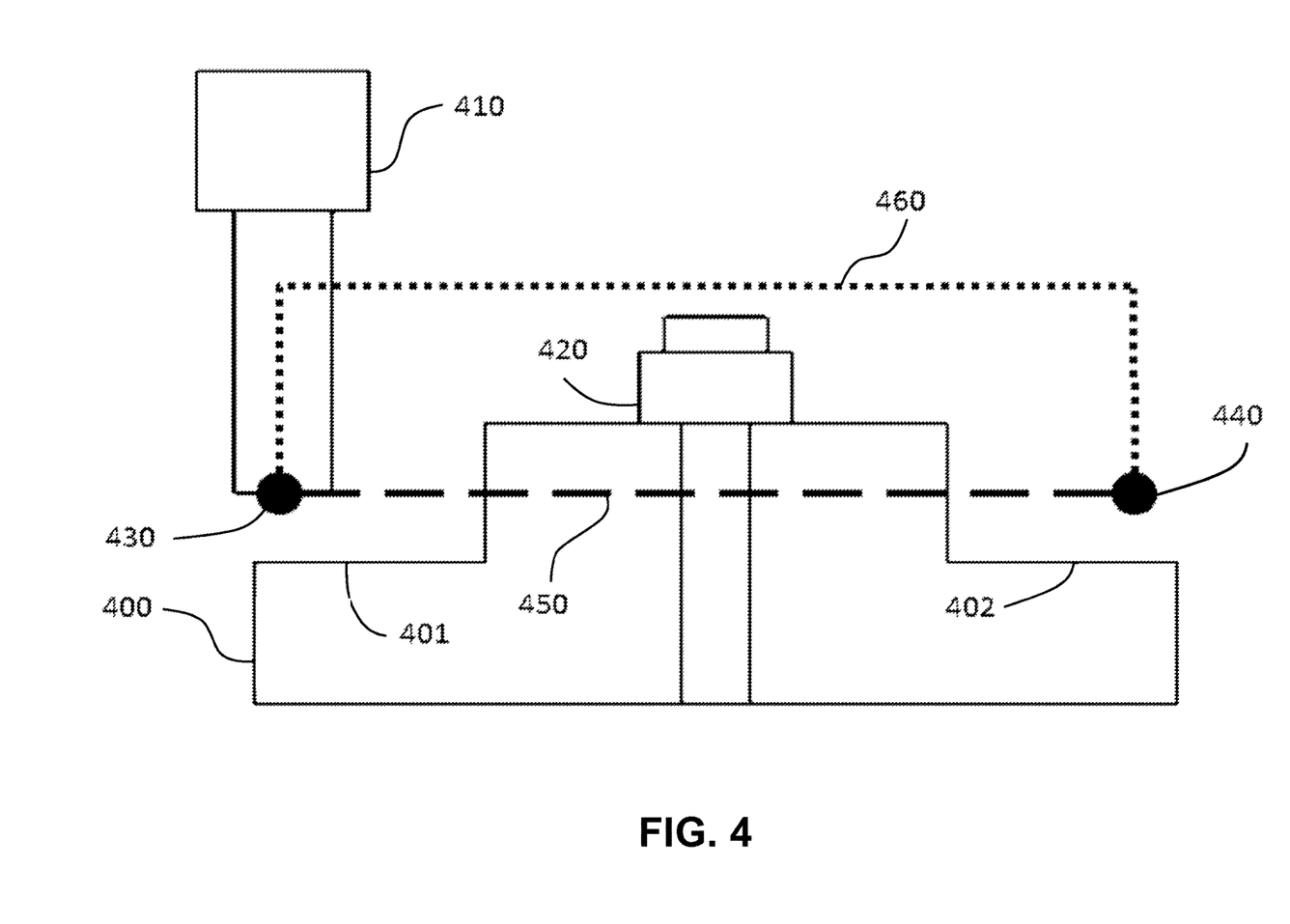
FIG. 4 depicts an exemplary embodiment of an optimized 3-axis strategy.

FIG. 4 depicts an exemplary embodiment of the optimized 3-axis strategy, where a number of attempts are made to position a tool 410 from the endpoint 430 of a machining operation applied to a machining area 401 to the end point 440 of a subsequent machining operation applied to a second machining area 402. The positioning should avoid any collisions or undesired contact with the workpiece 400, fixturing 420, and any other machine solids. First, an attempt may be made to try a straight motion 450 connecting the start to end positions. If this movement succeeds, this shall be the shortest and therefore the most effective motion possible. If this strategy fails, an attempt may be made to retract the tool as a single segment parallel to the plane defined by the tool axis. In this manner, the links calculator attempts to determine the shortest raising from the start/end point such that the motion 460 is valid. If the rotary solutions for the start and end positions are not the same, the necessary rotary axes are changed, and an optimized 3-axis link is determined 332 (FIG. 3).

Figure 5:
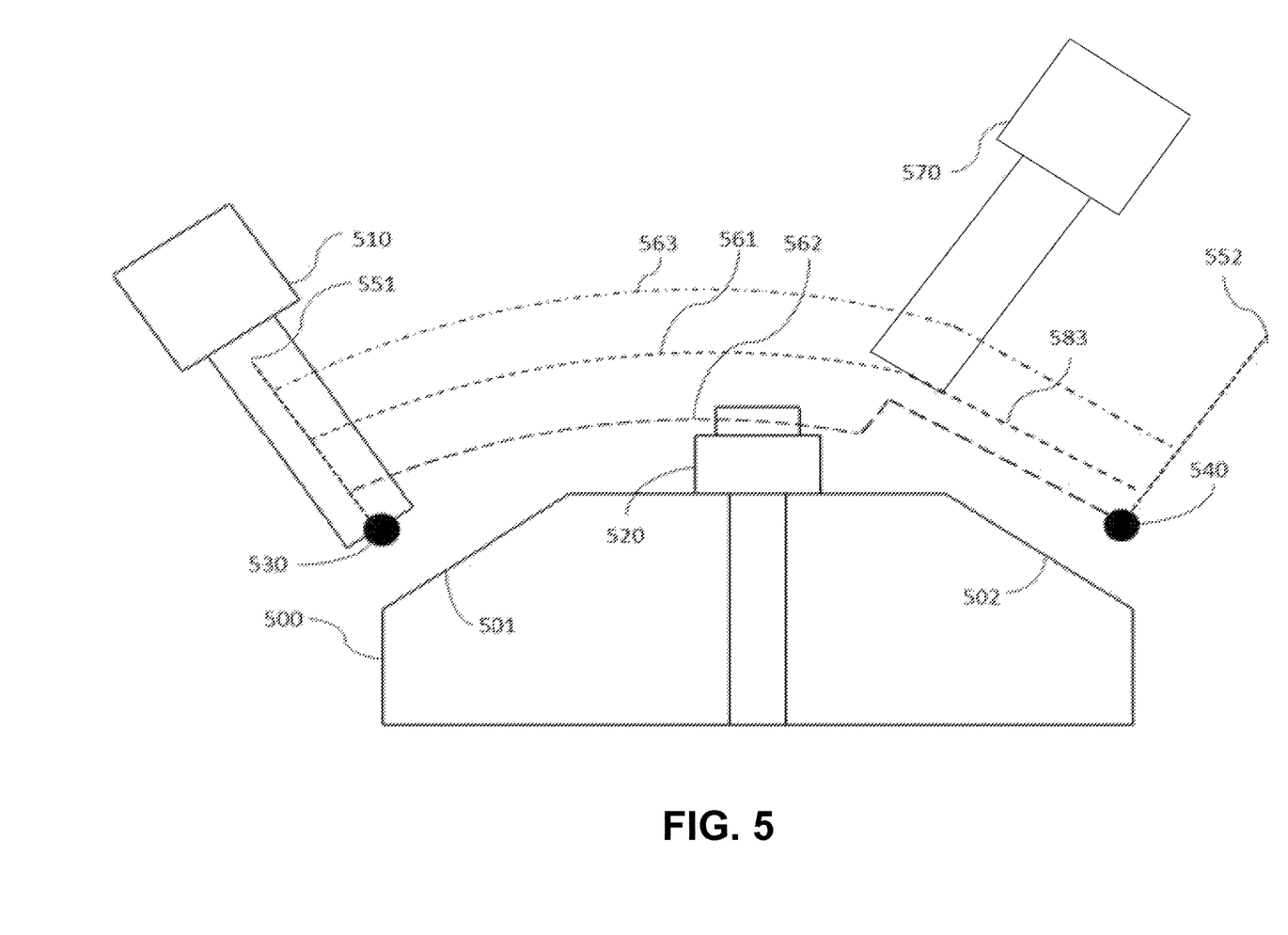
FIG. 5 depicts an exemplary embodiment where the start and end points are not the same.

FIG. 5 further illustrates the scenario where a rotary position of the start and end points are not the same, i.e., where the orientation of the tool is different for the start and the end point. Again, a number of attempts are made to position a tool 510 from the endpoint 530 of a machining operation applied to a machining area 501 to the end point 540 of a subsequent machining operation applied to a second machining area 502. The positioning should avoid any collisions or undesired contact with the workpiece 500, fixturing 520, and any other machine solids. The maximum retraction possible for the tool away from the workpiece is determined for the start 551 position and respective orientation. In one exemplary embodiment, a binary search algorithm may then be applied; starting at half of the maximum retract distance. The necessary axes are changed to realize the final tool orientation 570, and a resulting change axis toolpath 561, i.e., the toolpath created by moving one or more relevant rotational axes, may be calculated and validated. If that attempt fails, a higher attempt 563 is made. If the initial attempt succeeds, the height is again divided to determine if a lower calculation 562 is feasible. After the desired change axis toolpath is determined, an optimized 3-axis link similar to that described above and illustrated in FIG. 4 may be applied 583. This method is repeated by determining the maximum retraction along the end position 552, and again applying a change axis toolpath followed by an optimized 3-axis link. Should both of the results obtained by retracting along the initial 530 and final 540 positions be successful, the shortest result may be chosen based on these results.

Figure 6:
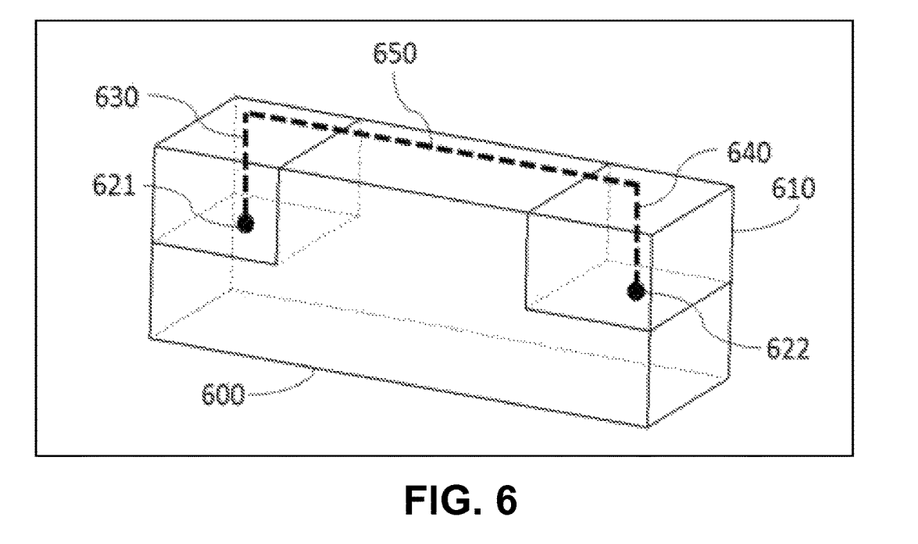
FIGS. 6-8 depict an exemplary embodiment of a forbidden zone link.
Figure 7:
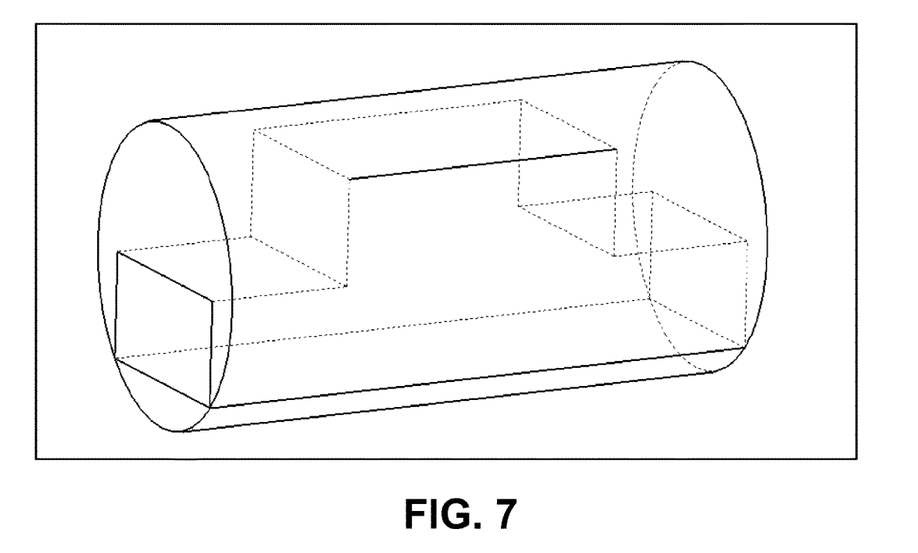
Figure 8:
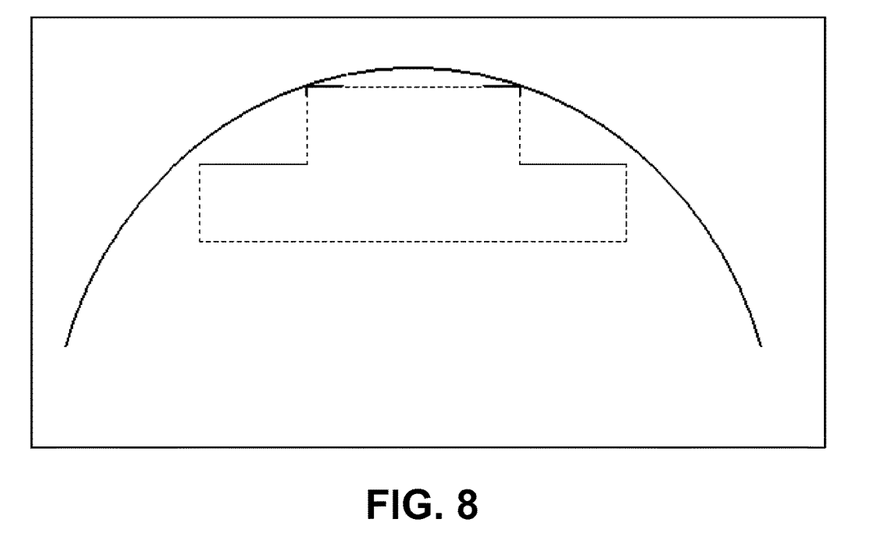

In another embodiment, should the previous attempts fail, a forbidden zone link 340 (FIG. 3), as illustrated in FIGS. 6-8 may be attempted. A forbidden zone describes a volume around the workpiece 610, the shape for which depends primarily on the machine kinematics type. FIG. 6 depicts an exemplary box which describes the forbidden zone for a head-head machine, and is simply a bounding box of the workpiece 600. FIG. 7 depicts an exemplary cylinder which describes the forbidden zone for a head-table machine, and takes the cylinder axis on the last rotary table axis, a radius big enough to encompass the workpiece, and top/bottom cylinder disks placed considering workpiece projections along the cylinder axis. FIG. 8 depicts an exemplary sphere which describes the forbidden zone for a table-table machine and is a spherical shape built with its center in the intersection of the two rotary axis directions, with a radius big enough to encompass the workpiece. Referring back to FIG. 6, the forbidden zone strategy first determines a movement out of the forbidden zone 630 from the start 621. Then, a movement to re-enter the forbidden zone 640, from a location on the boundary of the volume, to the end point 622 is determined. In addition, a motion 650 may be determined to connect the forbidden zone boundary points.

Figure 9:
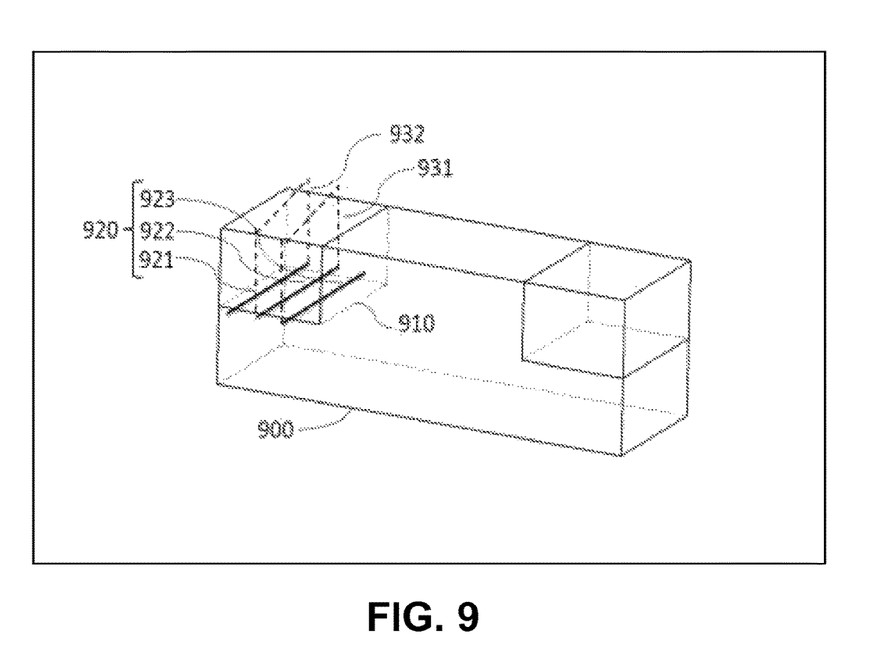
FIG. 9 depicts an exemplary embodiment where a positioning motion within a machining operation is determined.

FIG. 9 illustrates another exemplary embodiment of the links calculator computing device, where the links calculator may determine a positioning motion within a machining operation 920. Upon calculation of a toolpath that will remove the stock of a workpiece 900 from a defined area 910 by the planning module 110 (FIG. 1B), the CAM system may intentionally exclude the non-cutting positioning portions of the toolpath necessary to connect the cutting portions 921, 922, 923. The links calculator may determine—in the same methods previously designated—the necessary motions 931, 932 which will connect the toolpath elements.

Figure 10:
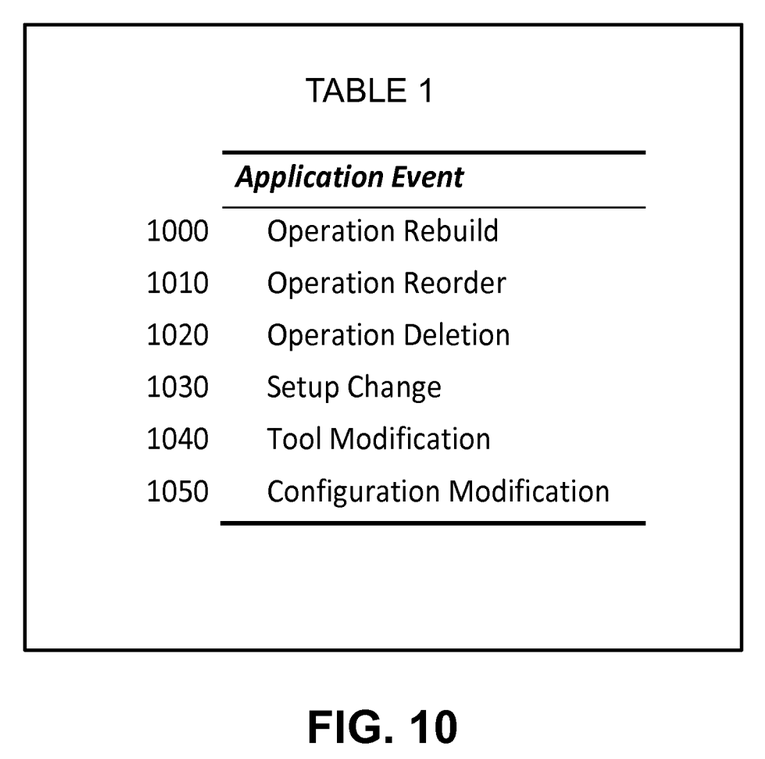
FIG. 10 depicts a table of exemplary notification of a stimulus event.

In another exemplary embodiment of the links calculator computing device, the CAM system may provide notification of a stimulus event, such as those listed in Table 1 of FIG. 10, which may result in calculation of a link. At such an event, depending on the appropriate context, a new link may be created, an existing link may be destroyed, or an existing link may be recreated. If in the CAM system an operation is recalculated 1000, often referred to as rebuilding that operation, the possibility exists that the state of the stock in subsequent operation may have changed, thus invalidating the existing links. Thus, the link preceding the rebuilt operation 1000 and all subsequent links are recreated. Similarly, if an operation is reordered 1010, the first invalidated link is the topmost between the one before the moved operation in its original position and in its new position in the operation list. If an operation is deleted 1020, the link to that operation is destroyed, and subsequent links must be recalculated. Any change in the machining setup of the CAM system 1030, for example a change in the defined workpiece size or position or a change in machine solids (including fixtures), requires that all links be recreated. Similarly, if a tool is modified 1040, the links surrounding every operation using that tool should be invalidated. Additionally, if any user configuration, or other parameters, which affect the resulting links are modified 1050, the links are recreated. In the exemplary embodiment, the responses to each stimulus event may occur automatically.

Figure 11:
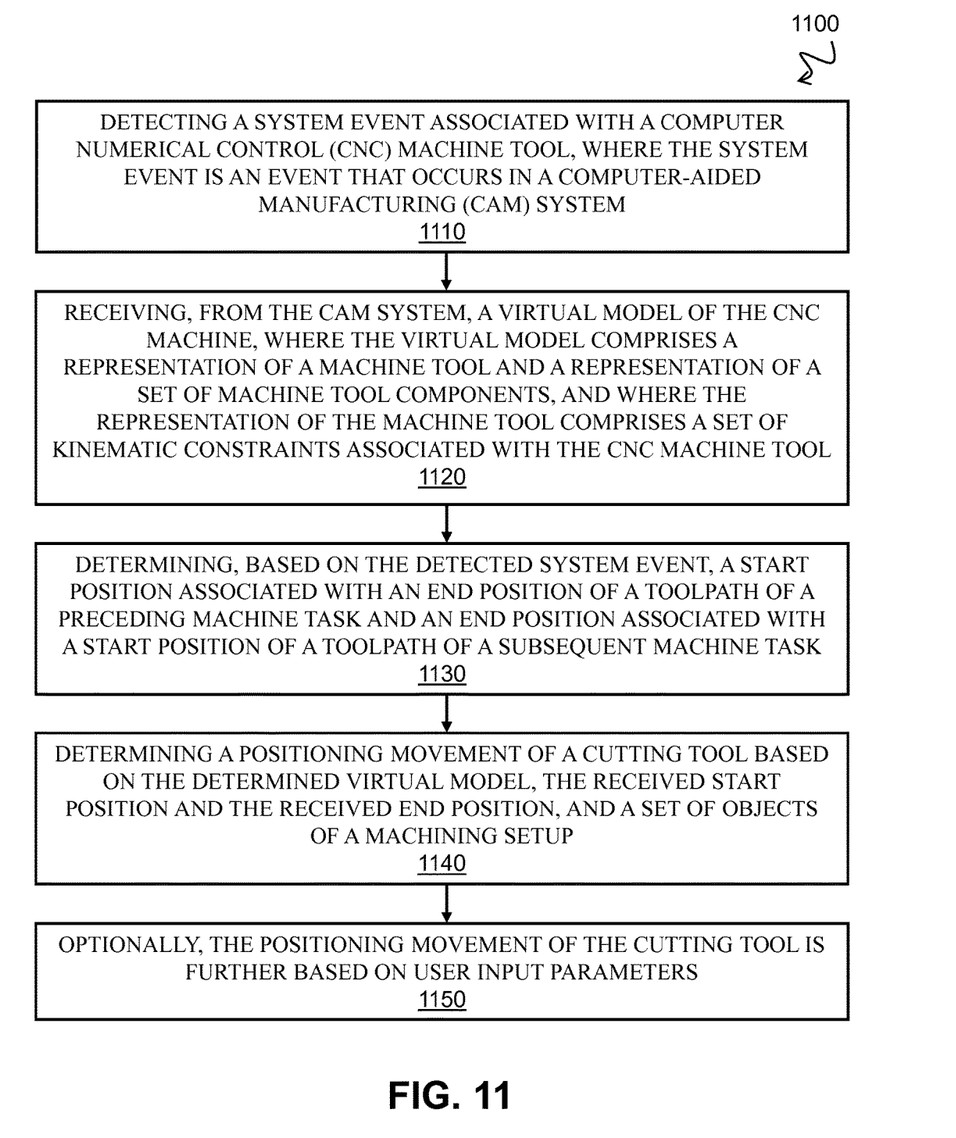
FIG. 11 depicts, in a top-level flowchart, an exemplary method of determining a positioning movement.

Embodiments may include an exemplary method of determining a positioning movement 1100, as illustrated in a top-level flowchart of FIG. 11. The exemplary steps of the positioning movement computing device may comprise the following steps: (a) detecting a system event associated with a computer numerical control (CNC) machine tool, where the system event is an event that occurs in a computer-aided manufacturing (CAM) system (step 1110); (b) receiving, from the CAM system, a virtual model of the CNC machine, where the virtual model comprises a representation of a machine tool and a set of machine tool components, and where the representation of the machine tool comprises a set of kinematic constraints associated with the CNC machine tool (step 1120); (c) determining a start position associated with an end position of a preceding toolpath of a machine task and an end position associated with a start position of a subsequent toolpath of a machine task, where the determining is based on the detected system event (step 1130); (d) determining a positioning movement of a cutting tool based on the received virtual model, the determined start position and the determined end position, and a set of objects of a machining setup (step 1140). Additionally, the determining of the positioning movement of the cutting tool may be based on the workpiece in its current state which may be based on material removal from previous cutting operations. Optionally, the positioning movement of the cutting tool may further be based on user input parameters (step 1150).

Figure 12:
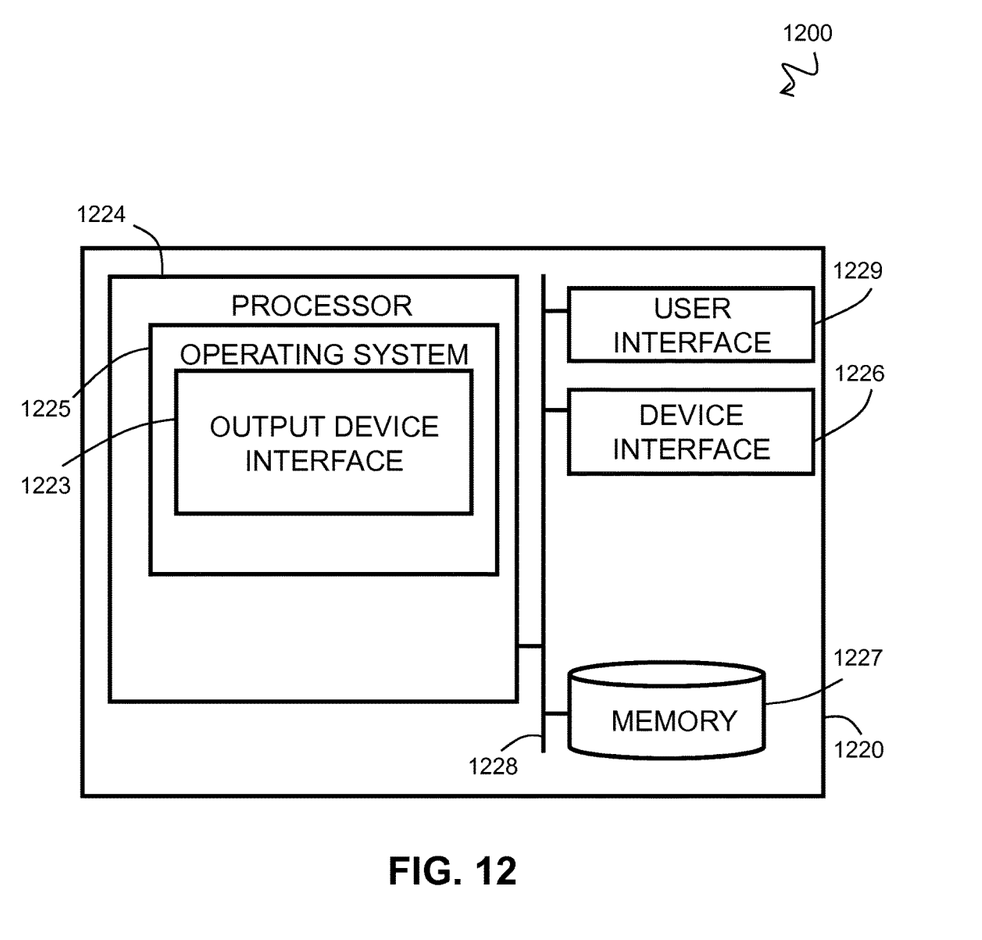
FIG. 12 depicts an exemplary top level functional block diagram of a computing device embodiment.

FIG. 12 illustrates an exemplary top level functional block diagram of a positioning movement computing device embodiment 1200. The exemplary operating environment is shown as a computing device 1220 comprising a processor 1224, such as a central processing unit (CPU); an addressable memory 1227, such as a lookup table, e.g., an array; an external device interface 1226, e.g., an optional universal serial bus port and related processing, and/or an Ethernet port and related processing; an output device interface 1223; and an optional user interface 1229, e.g., an array of status lights, and one or more toggle switches, and/or a display, and/or a keyboard and/or a pointer-mouse system and/or a touch screen. Optionally, the addressable memory may, for example, be: flash memory, SSD, EPROM, and/or a disk drive and/or another storage medium. These elements may be in communication with one another via a data bus 1228. An operating system 1225, such as one supporting the execution of applications, may comprise a processor 1224 which may be configured to execute steps of a positioning movement computing device to determine a positioning movement of a cutting tool based on a received virtual model, a determined start position and a determined end position, and a set of objects of a machining setup.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described.

What is claimed is:

1. A method comprising:
    detecting a system event associated with a computer numerical control (CNC) machine tool, wherein the system event is an event that occurs in a computer-aided manufacturing (CAM) system;
    determining, based on the detected system event, a start position associated with an end position of a toolpath of a preceding machine task and an end position associated with a start position of a toolpath of a subsequent machine task;
    receiving, from the CAM system, a virtual model of the CNC machine tool, wherein the virtual model comprises a representation of a machine tool and a representation of a set of machine tool components, and wherein the representation of the machine tool comprises a set of kinematic constraints associated with the CNC machine tool;
    determining a prioritized list of link strategies, wherein each strategy of the list of strategies is applied and checked to determine the validity of the particular strategy, and wherein the prioritized list of link strategies is based on determining whether the start position and the end position have the same axis and angular solution; and
    determining a positioning movement of a cutting tool based on the received virtual model, the determined start position and the determined end position, the determined prioritized list of link strategies, and a set of objects of a machining setup, wherein the positioning movement is determined automatically and dynamically, and wherein the determined positioning movement of the cutting tool is positioning movement transitions between machine tasks, wherein the machine tasks comprise: machining operations that are a cutting operation, machining operations that are a non-cutting operation, and tool changes.

2. The method of claim 1 wherein the positioning movement of the cutting tool is further based on user input parameters.

3. The method of claim 1 wherein the machining operations are a cutting operation.

4. The method of claim 1 wherein the start position and the end position describe a state of the CNC machine tool.

5. The method of claim 1 wherein the start position and the end position each comprise an orientation of the CNC machine tool.

6. The method of claim 1 wherein the positioning movement of the cutting tool is a non-cutting positioning movement between cutting movements by the CNC machine tool.

7. The method of claim 1 further comprising:
    computing an amount of material removed from the set of objects by a set of preceding machine tasks; and
    determining a current state of the set of objects based on the removed material.

8. The method of claim 7, further comprising:
    maintaining, via the CNC machine tool, a distance between the machine tool and the set of objects based on the determined current state of the set of objects thereby reducing unnecessary motions and a travel distance of the machine tool, and account for inaccuracies of the virtual model.

9. The method of claim 1 wherein the positioning movement of the cutting tool is further based on a movement where the machine tool is free of collisions with the set of objects.

10. The method of claim 1, further comprising:
    receiving, from the CAM system, a set of tool vectors, wherein the set of tool vectors are associated with the determined start position and the determined end position.

11. The method of claim 1, further comprising:
    receiving, from the CAM system, a set of rotary axis positions, wherein the set of rotary axis positions are associated with the determined start position and the determined end position.

12. The method of claim 1 wherein the virtual model of the CNC machine tool is based on material removed during previous operations.

13. The method of claim 1 wherein the determined positioning movement of the cutting tool are created, destroyed, or re-created as a response to a relevant system event.

14. The method of claim 1 wherein the determining of the positioning movement of the cutting tool is optimized in a CAM system based on an intricate awareness of the system events, a set of user preferences, machine tool, and the machining setup.

15. The method of claim 1 wherein the determining of the positioning movement of the cutting tool is further based on excluding the non-cutting positioning portions of the toolpath necessary to connect the cutting operation.

16. A device comprising:
    a processor and addressable memory, the processor configured to:
        detect a system event associated with a computer numerical control (CNC) machine tool, wherein the system event is an event that occurs in a computer-aided manufacturing (CAM) system;
        determine a start position associated with an end position of a preceding toolpath and an end position associated with a start position of a subsequent toolpath based on the detected system event;
        receive, from the CAM system, a virtual model of the CNC machine tool, wherein the virtual model comprises a representation of a machine tool and a set of machine tool components, and wherein the representation of the machine tool comprises a set of kinematic constraints associated with the CNC machine tool;
        determine a prioritized list of link strategies, wherein each strategy of the list of strategies is applied and checked to determine the validity of the particular strategy, and wherein the prioritized list of link strategies is based on determining whether the start position and the end position have the same axis and angular solution; and determine a positioning movement of a cutting tool based on the received virtual model, the determined start position and the determined end position, the determined prioritized list of link strategies, and a set of objects of a machining setup, wherein the positioning movement is determined automatically and dynamically, and wherein the determined positioning movement of the cutting tool is positioning movement transitions between machine tasks, wherein the machine tasks comprise machining operations that are a cutting operation, machining operations that are a non-cutting operation, and tool changes.

17. The device of claim 16, wherein the processor is further configured to:

maintain, via the CNC machine tool, a distance between the machine tool and the set of objects based on a computation of an amount of material removed from the set of objects by a set of preceding machine tasks and determination of a current state of the set of objects based on the removed material, thereby reducing unnecessary motions and a travel distance of the machine tool.

18. The device of claim 16, wherein the processor is further configured to:

receive, from the CAM system, at least one of: a set of tool vectors and a set of rotary axis positions, wherein the set of tool vectors and the set of rotary axis positions are each associated with the determined start position and the determined end position.

19. A computer-aided manufacturing (CAM) system comprising:

a planning module, wherein the planning module comprises a processor and an addressable memory, the processor configured to:

transmit a system event associated with a computer numerical control (CNC) machine tool, wherein the system event is an event that occurs in the CAM system; and a positioning calculator, wherein the positioning calculator comprises a processor and an addressable memory, the processor configured to:

determine a start position associated with an end position of a preceding toolpath and an end position associated with a start position of a subsequent toolpath based on the received system event from the planning module;

receive, from the CAM system, a virtual model of the CNC machine tool, wherein the virtual model comprises a representation of a machine tool and a set of machine tool components, and wherein the representation of the machine tool comprises a set of kinematic constraints associated with the CNC machine tool;

determine a prioritized list of link strategies, wherein each strategy of the list of strategies is applied and checked to determine the validity of the particular strategy, and wherein the prioritized list of link strategies is based on determining whether the start position and the end position have the same axis and angular solution; and determine a positioning movement of a cutting tool based on the received virtual model, the determined start position and the determined end position, the determined prioritized list of link strategies, and a set of objects of a machining setup, wherein the positioning movement is determined automatically and dynamically, and wherein the determined positioning movement of the cutting tool is positioning movement transitions between machine tasks, wherein the machine tasks comprise machining operations that are a cutting operation, machining operations that are a non-cutting operation, and tool changes.

20. The CAM system of claim 19, further comprising:

a machining apparatus; and wherein the positioning calculator is further configured to:

maintain, using the machining apparatus, a distance between the machine tool and the set of objects based on a computation of an amount of material removed from the set of objects by a set of preceding machine tasks and determination of a current state of the set of objects based on the removed material, thereby reducing unnecessary motions and a travel distance of the machine tool.

* * * * *